(12) United States Patent
Hays et al.

(10) Patent No.: US 10,303,633 B2
(45) Date of Patent: May 28, 2019

(54) METHOD AND APPARATUS TO CONTROL A MODE OF A DEVICE

(71) Applicant: Micro Motion, Inc., Boulder, CO (US)

(72) Inventors: Paul J Hays, Lafayette, CO (US); Craig B McAnally, Thornton, CO (US); William M Mansfield, Niwot, CO (US); Brian T Smith, Johnstown, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 15/506,109

(22) PCT Filed: Sep. 15, 2014

(86) PCT No.: PCT/US2014/055582
§ 371 (c)(1),
(2) Date: Feb. 23, 2017

(87) PCT Pub. No.: WO2016/043693
PCT Pub. Date: Mar. 24, 2016

(65) Prior Publication Data
US 2017/0242707 A1    Aug. 24, 2017

(51) Int. Cl.
*G06F 1/26*     (2006.01)
*G06F 1/32*     (2019.01)
*G06F 13/38*    (2006.01)
*G06F 13/40*    (2006.01)
*G06F 9/4401*   (2018.01)
*G06F 1/3296*   (2019.01)

(52) U.S. Cl.
CPC ............ *G06F 13/385* (2013.01); *G06F 1/266* (2013.01); *G06F 1/3296* (2013.01); *G06F 9/4411* (2013.01); *G06F 13/4063* (2013.01); *G06F 2213/0042* (2013.01); *G06F 2213/3812* (2013.01)

(58) Field of Classification Search
CPC ... G06F 1/26; G06F 1/266; G06F 1/28; G06F 9/4411; G06F 9/4413; G06F 9/4415; G06F 11/3051; G06F 13/385; G06F 13/4081; G06F 13/42; G06F 13/4282; G06F 1/3296; G06F 13/4063
See application file for complete search history.

(56) References Cited

U.S. PATENT DOCUMENTS

| | | | |
|---|---|---|---|
| 7,193,442 B2 * | 3/2007 | Zhu | G06F 13/4081 326/102 |
| 7,635,280 B1 | 12/2009 | Crumlin et al. | |
| 2008/0222438 A1 | 9/2008 | Lin et al. | |
| 2010/0057946 A1 | 3/2010 | Crumlin et al. | |
| 2010/0298029 A1 | 11/2010 | Jang | |

(Continued)

FOREIGN PATENT DOCUMENTS

| | | |
|---|---|---|
| CN | 102023955 A | 4/2011 |
| JP | 2005182385 A | 7/2005 |
| JP | 2011096238 A | 5/2011 |

*Primary Examiner* — Thomas J Cleary
(74) *Attorney, Agent, or Firm* — The Ollila Law Group LLC (57) ABSTRACT

A method of controlling a mode of a device is provided. The method includes determining a Vbus voltage on a Vbus pin in a USB connector on the device, comparing the Vbus voltage with a threshold, and configuring the device based on the comparison of the Vbus voltage and the threshold.

15 Claims, 5 Drawing Sheets

(56) References Cited

U.S. PATENT DOCUMENTS

2013/0169053 A1    7/2013   Lin et al.
2013/0238819 A1    9/2013   Oljaca et al.
2013/0326094 A1   12/2013   Yu et al.

* cited by examiner

METHOD AND APPARATUS TO CONTROL A MODE OF A DEVICE

TECHNICAL FIELD

The present invention relates to devices and, more particularly, to a method and apparatus to control a mode of a device.

STATEMENT OF THE PROBLEM

The Universal Serial Bus (USB) standard originally specified data connections between electronic hardware with predefined roles. The roles defined by the USB standard are generally referred to as "host" and "slave". The host includes a USB Host Controller that controls and initiates all data communications between the host and the slave. The host also typically supplied power to the slave so the slave could respond to the communication from the host. To prevent a host from being attached to another host, the USB standard defined different connectors for the host and the slave. In particular, the USB standard required that hosts have a type-A connector and the slave have a type-B connector.

As the USB standard became widely accepted, devices were built that sometimes needed to be a host and, at other times, a slave. For example, a camera might need to function as a host to a printer and a slave to a computer. Accordingly, the USB standard was updated with an addendum or secondary standard called "On The Go" (OTG) that allowed devices to function as a host or a slave. The OTG standard defined a new set of connectors and cables. The OTG compliant connectors include pins that are in addition to the pins in the original USB connectors. As a result, the OTG compliant connectors are not compatible with the original USB connectors and cables. In addition, the OTG standard created stackware/firmware complexity to allow functionality beyond that of simple automatic switching between the host and slave roles.

Due to benefits obtained with the OTG standard, there is a desire to implement OTG features in existing hardware designs. However, for many designs, incorporating the OTG compliant connectors is not feasible. For example, existing designs would have to be updated with additional traces to account for the additional pins. Moreover, some hardware designs would have to be completely revamped due to the software over-head associated with the communications stack specified by the OTG standard.

In addition, many device manufacturers have customers with peripherals that are not OTG compliant. For example, some customers of industrial equipment deployed USB thumb drives with type-A connectors to save data from devices for subsequent analysis. The customers may also control the devices with older computers and programs that are not upgradeable to the OTG standard. As a result, upgrading the devices with OTG compliant connectors would require the customers to replace their inventory of peripheral devices, which the device manufacturers would like to avoid.

Accordingly, there is a need for an apparatus and a method for controlling the mode of a device when the device includes USB connectors that are not OTG compliant. There is also a need to control the mode of the device without the additional software over-head and hardware redesigns associated with the OTG standard.

SUMMARY OF THE INVENTION

A method of controlling a mode of a device is provided. According to an embodiment, the method comprises determining a Vbus voltage on a Vbus pin in a USB connector on the device, comparing the Vbus voltage with a threshold, and configuring the device based on the comparison of the Vbus voltage and the threshold.

An apparatus (100) to control a mode of a device (10) is provided. According to an embodiment, the apparatus (100) is comprised of a processor (110) and a voltage comparison module (130) coupled to the processor (110), wherein the processor (110) and the voltage comparison module (130) are adapted to determine a Vbus voltage on a Vbus pin (210) in a USB connector (200) on the device (10), the voltage comparison module (130) is adapted to compare the Vbus voltage with a threshold, and the processor (110) is adapted to configure the device (10) based on the comparison of the Vbus voltage and the threshold.

ASPECTS OF THE INVENTION

According to an aspect, a method of controlling a mode of a device comprises determining a Vbus voltage on a Vbus pin in a USB connector on the device, comparing the Vbus voltage with a threshold, and configuring the device based on the comparison of the Vbus voltage and the threshold.

Preferably, the step of determining the Vbus voltage on the Vbus pin comprises determining if the device is applying a voltage to the Vbus pin; if the device is not applying the voltage to the Vbus pin, then configuring the device based on the comparison of the Vbus voltage and the threshold, and if the device is applying the voltage to the Vbus pin, then continue determining if the device is applying a voltage to the Vbus pin until the device is not applying the voltage to the Vbus pin.

Preferably, the step of configuring the device based on the comparison of the Vbus voltage and the threshold comprises determining if a response is received at the USB connector; if the response is not being received at the USB connector, then stop applying the voltage to the Vbus pin, and if the response is being received at the USB connector, then configuring the device as a host.

Preferably, the step of comparing the Vbus voltage on the Vbus pin with the threshold comprises determining if the Vbus voltage is greater than the threshold, then indicating that a peripheral configured as a host is attached to the USB connector, and if the Vbus voltage is less than the threshold, then indicating that a peripheral configured as a slave is attached to the USB connector.

Preferably, the step of configuring the device based on the comparison of the Vbus voltage and the threshold comprises: if the comparison indicates that a peripheral configured as a slave is attached to the USB connector, then configuring the device as a host, and if the comparison indicates that a peripheral configured as a host is attached to the USB connector, then configuring the device as a slave.

Preferably, the step of configuring the device based on the comparison of the Vbus voltage and the threshold comprises applying a voltage to the Vbus pin, monitoring the USB connector to determine if a response is received; if the response is not received, then stop applying the voltage to the Vbus pin, and if the response is received, then configuring the device as the host.

Preferably, configuring the device is comprised of selectively applying a voltage to the Vbus pin and configuring the device with one of a slave stack and a host stack.

According to an aspect, an apparatus (100) to control a mode of a device (10) is comprised of a processor (110) and a voltage comparison module (130) coupled to the processor (110), wherein the processor (110) and the voltage comparison module (130) are adapted to determine a Vbus voltage on a Vbus pin (210) in a USB connector (200) on the device (10), the voltage comparison module (130) is adapted to compare the Vbus voltage with a threshold, and the processor (110) is adapted to configure the device (10) based on the comparison of the Vbus voltage and the threshold.

Preferably, the processor (110) and the voltage comparison module (130) adapted to determine the Vbus voltage on the Vbus pin (210) comprises the processor (110) adapted to determine if the device (10) is applying a voltage to the Vbus pin (210), and the voltage comparison module (130) adapted to measure a Vbus voltage on the Vbus pin (210), and the processor (110) adapted to configure the device (10) based on the comparison of the Vbus voltage and the threshold comprises the processor (110) adapted to determine if the device (10) is applying a voltage to the Vbus pin (210); if the device (10) is not applying the voltage to the Vbus pin (210), then configure the device (10) as a host based on the comparison of the Vbus voltage and the threshold, and if the device (10) is applying the voltage to the Vbus pin (210), then continue to determine if the device (10) is applying the voltage to the Vbus pin (210) until the device (10) is not applying the voltage to the Vbus pin (210).

Preferably, the processor (110) adapted to configure the device (10) based on the comparison of the Vbus voltage and the threshold comprises the processor (110) adapted to determine if a response is received at the USB connector (200); if the response is not received at the USB connector (200), then stop applying the voltage to the Vbus pin (210), and if the response is received at the USB connector (200), then configure the device (10) as a host.

Preferably, the voltage comparison module (130) adapted to compare the Vbus voltage on the Vbus pin (210) with the threshold comprises the voltage comparison module (130) adapted to measure the Vbus voltage on the Vbus pin (210); if the Vbus voltage is greater than the threshold, then indicate that a peripheral (250) configured as a host is attached to the USB connector (200), and if the Vbus voltage is less than the threshold, then indicate that a peripheral (250) configured as a slave is attached to the USB connector (200).

Preferably, the processor (110) adapted to configure the device (10) based on the comparison of the Vbus voltage and the threshold comprises the processor (110) adapted to, if the comparison indicates that a peripheral (250) configured as a slave is attached to the USB connector (200); then configure the device (10) as a host, and if the comparison indicates that a peripheral (250) configured as a host is attached to the USB connector (200), then configure the device (10) as a slave.

Preferably, the apparatus (100) further comprises a power supply module (120) coupled to the processor (110) and the Vbus pin (210), the power supply module (120) adapted to selectively apply a voltage to the Vbus pin (210), wherein the processor (110) adapted to configure the device (10) based on the comparison between the Vbus voltage and the threshold comprises the processor (110) adapted to send a signal to the power supply module (120) to cause the power supply module (120) to apply the voltage to the Vbus pin (210), monitor the USB connector (200) to determine if a response is received; if the response is not received, then stop applying the voltage to the Vbus pin (210), and if the response is received, then configure the device (10) as a host.

Preferably, the processor (110) adapted to apply a voltage to the Vbus pin (210) comprises the processor (110) adapted to send a signal to the power supply module (120) to apply a voltage to the Vbus pin (210).

Preferably, the apparatus (100) adapted to configure the device (10) comprises the apparatus (100) adapted to selectively apply a voltage to the Vbus pin (210) and configure the device with one of a slave stack and a host stack.

DESCRIPTION OF THE DRAWINGS

The same reference number represents the same element on all drawings. The drawings are not necessarily to scale.

DETAILED DESCRIPTION

FIGS. 1-5 and the following description depict specific examples to teach those skilled in the art how to make and use the best mode of embodiments of a method and apparatus to control a mode of a device. For the purpose of teaching inventive principles, some conventional aspects of the method and apparatus to control the mode of the device have been simplified or omitted. Those skilled in the art will appreciate variations from these examples that fall within the scope of the present description. Those skilled in the art will appreciate that the features described below can be combined in various ways to form multiple variations of the apparatus and method for controlling the mode of the device. As a result, the embodiments described below are not limited to the specific examples described below, but only by the claims and their equivalents.

Figure 1:
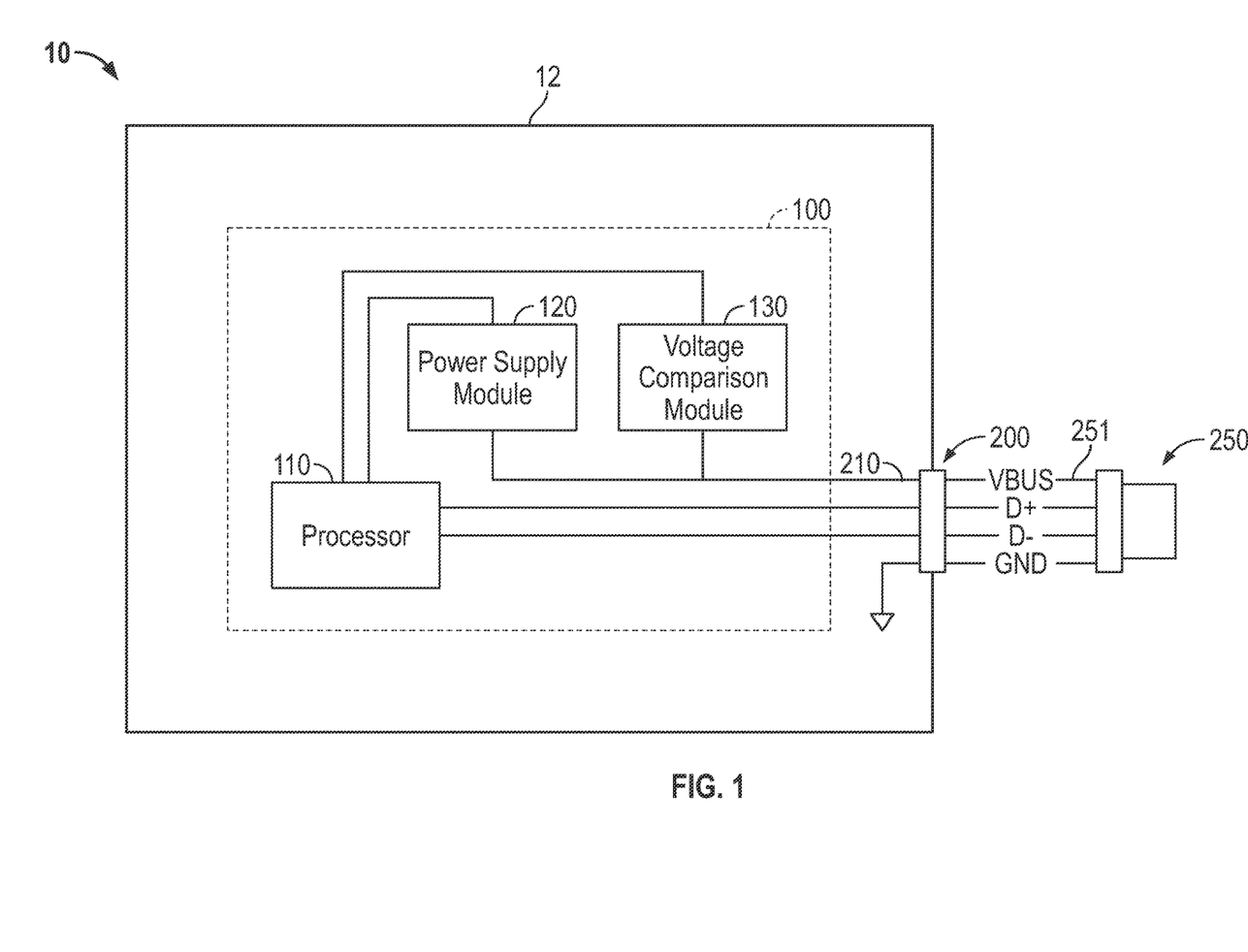
FIG. 1 shows a device 10 according to an embodiment.

FIG. 1 shows a device 10 according to an embodiment. In the embodiment shown, the device 10 includes an apparatus 100 to control the mode of the device 10. The device 10 also includes a circuit board 12 with a USB connector 200. In the embodiment shown, the USB connector 200 is coupled to the edge of the circuit board 12, although alternative locations are within the scope of this disclosure. The apparatus 100 is coupled to the circuit board 12 and is electrically coupled to the USB connector 200 with traces, which are shown as lines. However, in alternative embodiments, the apparatus 100 may not be coupled to the circuit board 12.

In the embodiment shown in FIG. 1, the apparatus 100 includes a processor 110 that is electrically coupled to a power supply module 120, a voltage comparison module 130, and the USB connector 200. The power supply module 120 is electrically coupled to a Vbus pin 210 in the USB connector 200. The voltage comparison module 130 is also electrically coupled to the Vbus pin 210. In addition to the Vbus pin 210, the USB connector 200 includes two digital communication pins D+, D− and a ground pin GND. The digital communication pins D+, D− are used for serial communications between the device 10 and a peripheral 250 that is attached to the USB connector 200.

The peripheral 250 can be any hardware with a USB connector that is compatible with the USB connector 200. For example, in the embodiment shown in FIG. 1, the peripheral 250 may be a memory stick configured as a slave. The memory stick may have a type-A USB connector. Accordingly, the device 10 would be configured as a host. Alternatively, the peripheral 250 could be a personal computer configured as a host that is attached to the USB connector 200 via a cable. Accordingly, the device 10 would be configured as a slave. Although the device 10 and the peripheral 250 are described as being configured as a slave or a host, other roles not generally referred to as 'host' or 'slave' are within the scope of this disclosure. In the embodiment of FIG. 1, the device 10, in either the host or the slave configuration, can communicate with the peripheral 250 via the USB connector 200, which may comply with the USB standard.

The USB standard mandates that the Vbus pin 210 have a voltage that is supplied by the device 10 or the peripheral 250 attached to the USB connector 200, depending on the connector type. Accordingly, the peripheral 250 is also shown as including a Vbus pin 251. As will be discussed in more detail in the following, the device 10 or the peripheral 250 can supply power to the Vbus pins 210, 251 regardless of the connector type. As a result, the device 10 and the peripheral 250 can receive power to operate as a slave, depending on which one is supplying the power to the Vbus pins 210, 251, even though the USB connector 200 is not compliant with the OTG standard.

The USB connector 200 is not compliant with the OTG standard because the OTG standard is restricted to OTG compliant connectors, such as the Micro-USB connector, which have an ID pin. The ID pin is used to identify the modes of the two devices that are connected together with the OTG compliant connector. For example, one of the devices can allow the ID pin to float while the other device has a grounded ID pin. The floating and the grounded states of the ID pins are used to define the roles of the devices. The OTG standard also specifies that a Host Negotiation Protocol (HNP) and a Role Swap Protocol (RSP) be used to configure the modes of the two devices. That is, the two devices negotiate their roles through a complex protocol stack that includes features such as a slave requesting to be a host, interrupt polling, etc. In contrast, the USB connector 200 shown in FIG. 1 does not necessarily require a complex protocol stack and does not have an ID pin.

Nevertheless, as will be explained in more detail in the following, the apparatus 100 can control the mode of the device 10. For example, instead of relying on the ID pin, the apparatus 100 can determine a Vbus voltage on a Vbus pin 210 in a USB connector 200 on the device 10. The apparatus 100 can compare the Vbus voltage with a threshold and configure the device 10 based on the comparison of the Vbus voltage and the threshold. Accordingly, the additional ID pin and the corresponding RSP and HNP protocols required by the OTG standard are not needed. Advantageously, USB connectors that are not compliant with the OTG standard may nevertheless be used to configure devices as a host or a slave.

Figure 2:
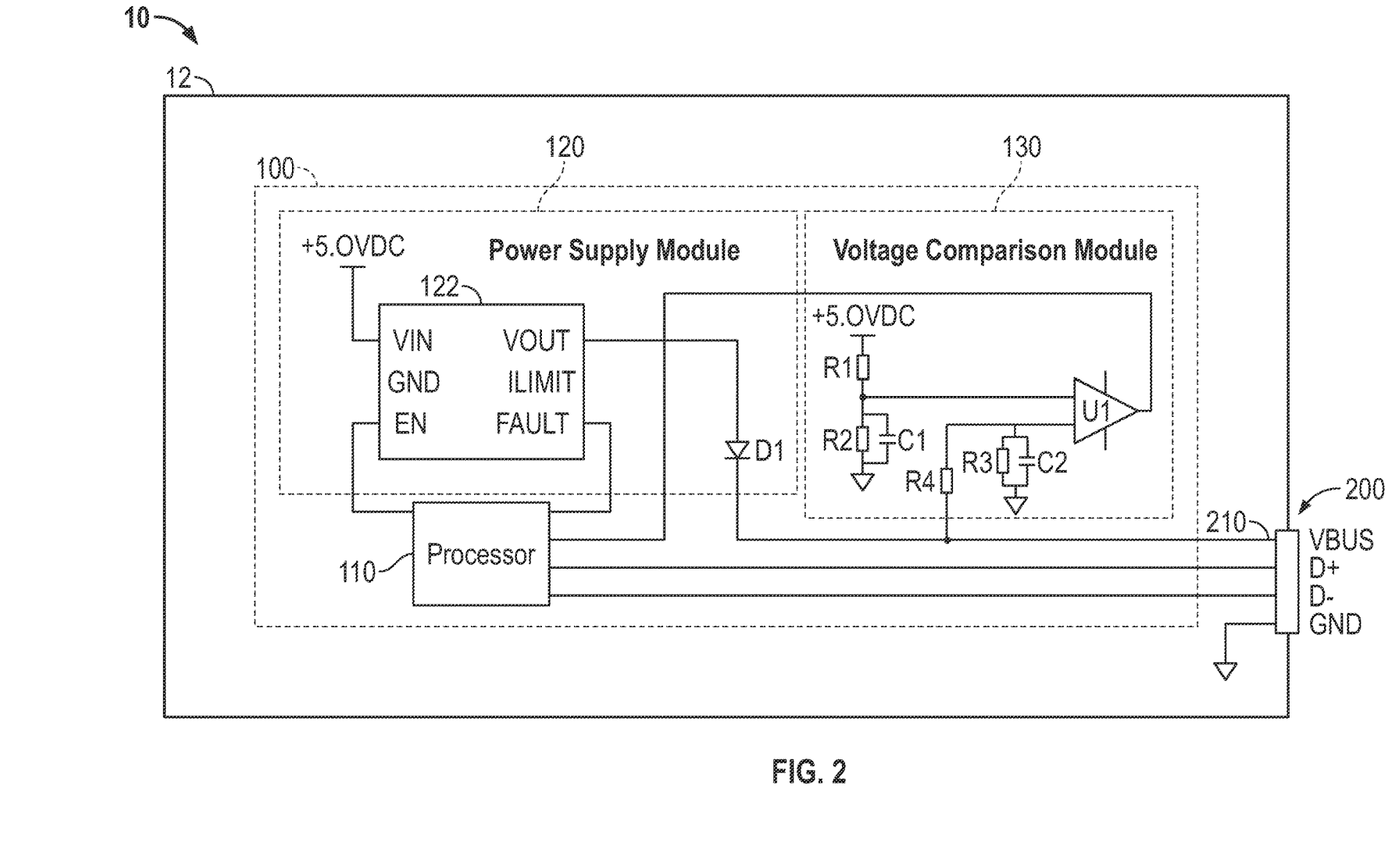
FIG. 2 shows a more detailed view of the apparatus 100 in the device 10.

FIG. 2 shows a more detailed view of the apparatus 100 in the device 10. As shown, the apparatus 100 includes the processor 110, the power supply module 120, and the voltage comparison module 130 described in the foregoing with respect to FIG. 1. The processor 110 is electrically coupled to the power supply module 120, the voltage comparison module 130, and the USB connector 200. Although the apparatus 100 is shown as coupled to the USB connector 200 with traces, alternative communication paths may be employed. In addition, the processor 110, the power supply module 120, and the voltage comparison module 130 are shown as being part of the device 10 but may be separate from the device 10 in alternative embodiments.

In the embodiment shown in FIG. 2, the processor 110 may be adapted to configure the device 10. For example, the processor 110 can be a central processing unit (CPU) with software that commands the power supply module 120 to turn on or off a voltage supply to the Vbus pin 210. The processor 110 can also receive a signal from the voltage comparison module 130 that, for example, represents the Vbus voltage on the Vbus pin 210. The processor 110 may also be adapted to communicate over the digital communication pins D+, D−. However, in alternative embodiments, the processor 110 may not be coupled to the digital communication pins D+, D−. For example, a different processor or other device could be electrically coupled to the digital communication pins D+, D−. These and other processors can control the power supply module 120.

The power supply module 120 includes a power switch 122 and a diode D1. The power switch 122 has a supply pin VIN that is coupled to a supply voltage, which is shown as being +5.0 VDC. The power switch 122 also includes an enable pin EN that is coupled to the processor 110 and a voltage out pin VOUT that is coupled to the Vbus pin 210 via the diode D1. Accordingly, the processor 110 can enable the voltage out VOUT to supply voltage to the Vbus pin 210, which may be provided by the +5.0 VDC supply voltage coupled to the supply pin VIN. The power switch 122 is also shown as including the ground pin GND, a current limit pin ILIMIT, and a fault pin FAULT. The ground pin GND and the current limit pin ILIMIT are shown as not being coupled to anything for clarity. The fault pin FAULT is coupled to the processor 110. Accordingly, the processor 110 can detect a fault state in the power switch 122. The processor 110 can also receive a signal from components in the voltage comparison module 130.

The voltage comparison module 130 includes a voltage comparator U1 that is coupled to the Vbus pin 210. The voltage comparator U1 is also shown as coupled to a first resistor R1 and a second resistor R2. The resistors R1 and R2 can serve as a voltage divider for a reference input on the voltage comparator U1. The second resistor R2 can also provide a discharge path for the reference input. The first resistor R1 is coupled to the supply voltage, which is shown as +5.0 VDC. A voltage input on the voltage comparator U1 is coupled to the Vbus pin 210 in the USB connector 200. The voltage input is adapted to, for example, measure a Vbus voltage on the Vbus pin 210. Also shown in FIG. 2 is a first capacitor C1 coupled to the reference input and a second capacitor C2 coupled to the voltage input. The capacitors C1 and C2 can stabilize the voltages on the reference and voltage inputs. A third resistor R3 and fourth resistor R4 are coupled to the voltage input, which can provide a discharge path for the Vbus pin 210. Alternative embodiments can have different configurations of resistors and capacitors.

In the embodiment shown, the values of the resistors R1, R2 can be selected to provide a threshold to the reference pin. For example, the values of the resistors R1, R2 can be selected such that the voltage on the reference input on the voltage comparator U1 is at a desired threshold voltage. Similarly, the values of the third and fourth resistors R3, R4 can be selected to provide a voltage that is within a desired range for a Vbus voltage on the Vbus pin 210. In addition, the third and fourth resistors R3, R4 can provide a discharge path for a voltage on the reference input on the comparator U1. Therefore, if the peripheral 250 accumulates a charge due to the device 10 applying a voltage to the Vbus pin 210, the accumulated voltage on the Vbus pin 210 can discharge through the third and fourth resistors R3, R4. Accordingly, the voltage can be discharged before the Vbus voltage is measured, for example, after a loop.

The voltage comparator U1 can measure the Vbus voltage on the Vbus pin 210 and compare the Vbus voltage with the threshold. If, for example, the Vbus voltage is greater than the threshold, the voltage comparator U1 can send a signal to the processor 110 indicating that the Vbus voltage is greater than the threshold. In alternative embodiments, different methods of comparing the Vbus voltage with the threshold can be employed. For example, a different configuration of resistors and capacitors, additional voltage comparators, digital logic, etc. can be employed to compare the Vbus voltage with the threshold.

The processor 110 can configure the device 10 based on the comparison between the Vbus voltage and the threshold. For example, in the embodiment shown in FIG. 2, the processor 110 can configure the device 10 as a slave if the comparison indicates that a peripheral 250 attached to the USB connector 200 is configured as a host. The processor 110 can also configure the device 10 as a host if the comparison indicates the peripheral 250 attached to the USB connector 200 is configured as a slave. The apparatus 100 can be adapted to perform these and other methods, as will be described in more detail in the following with reference to FIGS. 3-6.

Figure 3:
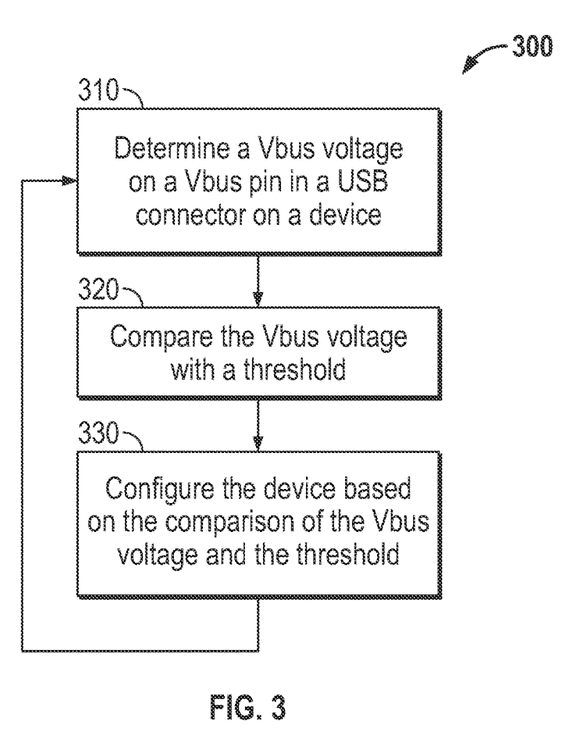
FIG. 3 shows a method 300 according to an embodiment.

FIG. 3 shows a method 300 according to an embodiment. As shown in FIG. 3, the method 300 includes a step 310 that determines a Vbus voltage on a Vbus pin in a USB connector on a device. After step 310, step 320 compares the Vbus voltage with a threshold. The apparatus 100 can configure the device 10 based on the comparison of the Vbus voltage and the threshold in step 330. The steps 310-330 are described in more detail in the following.

In step 310, the apparatus 100 can determine the Vbus voltage on the Vbus pin 210 in the USB connector 200. For example, the processor 110 and the voltage comparison module 130 may be adapted to determine the Vbus voltage on the Vbus pin 210. In the embodiment of FIG. 1, the processor 110 can receive signals from the power supply module 120 and the voltage comparison module 130. Using these signals, the processor 110 can determine if the voltage on the Vbus pin 210 is due to the power supply module 120 or the peripheral 250 attached to the USB connector 200. In some embodiments, the apparatus 100 may continue determining the Vbus voltage until the Vbus voltage is due to peripheral 250.

In step 320, the apparatus 100 can compare the Vbus voltage with the threshold. For example, in the embodiment shown in FIG. 1, the voltage comparison module 130 can compare the Vbus voltage with the threshold that is, for example, determined by components such as resistors in the voltage comparison module 130. For example, the resistors R1, R2 shown in FIG. 2 can divide the +5.0 VDC supply voltage. The voltage where the second resistor R2 is coupled to the voltage comparator U1 ("R2 voltage") can be the threshold.

In step 330, the method 300 can configure the device 10 based on the comparison of the Vbus voltage and the threshold. For example, the processor 110 can configure the power supply module 120 to selectively apply a voltage to the Vbus pin 210. In the embodiment shown in FIG. 2, the processor 110 can send a signal to the enable pin EN on the power switch 122 to selectively apply the voltage to the Vbus pin 210. The voltage can be applied to the Vbus pin 210 with the voltage out pin VOUT through the diode Dl. After the device 10 is configured, the method 300 of controlling the mode of the device 10 can return to step 310.

The foregoing described method 300 and the steps 310-330 can be implemented with various additional and alternative steps. Exemplary methods having alternative steps are described in the following with reference to FIGS. 4 and 5.

Figure 4:
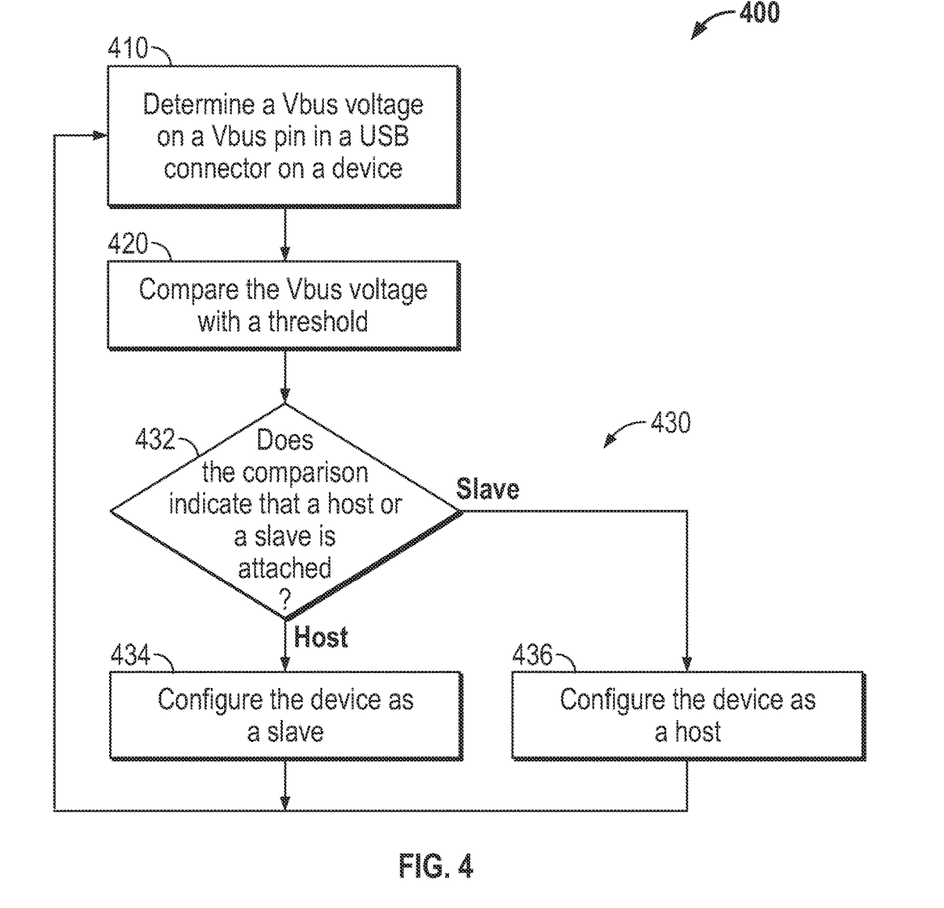
FIG. 4 shows a method 400 according to an embodiment.

FIG. 4 shows a method 400 according to an embodiment. The method 400 includes a step 410 that determines the Vbus voltage on the Vbus pin 210. In step 420, the Vbus voltage is compared with the threshold. After step 420, the method 400 decides if the comparison indicates that the peripheral 250 attached to the USB connector 200 is configured as a host or a slave in step 430, which is comprised of steps 432-434. Depending on the comparison, the device 10 can be configured as a host or a slave, as will be described in more detail in the following.

In step 432, the comparison between the Vbus voltage and the threshold can indicate the configuration of the peripheral 250 attached to the USB connector 200. For example, in the embodiment shown in FIG. 1, the voltage comparison module 130 can compare the Vbus voltage on the Vbus pin 210 with a voltage threshold. The voltage comparison module 130 can indicate to the processor 110 whether the peripheral 250 is configured as a host or a slave. In the embodiment shown in FIG. 2, the voltage comparator U1 can compare the Vbus voltage and the R2 voltage and send a signal to processor 110 indicating if the peripheral 250 attached to the USB connector 200 is a slave or a host. The signal may be a digital signal where a high voltage representing a "1" bit that indicates that the peripheral 250 is configured as a host and a low voltage, such as a zero voltage, representing a "0" bit that indicates that the peripheral 250 is configured a slave.

In steps 434 and 436, the processor 110 can send a signal to the power supply module 120 to selectively apply a voltage to the Vbus pin 210, depending on the comparison made in step 432. For example, if the comparison indicates that the peripheral 250 is configured as a host, then the device 10 can be configured as a slave in step 434. If the comparison indicates that the peripheral 250 is configured as a slave, then the device 10 can be configured as a host. In the embodiment shown in FIG. 2, the processor 110 can send a signal to the enable pin EN on the power switch 122 to configure the device 10. Depending on the signal sent to the enable pin EN, the power switch 122 can apply a voltage to the Vbus pin 210. Selectively applying the voltage to the Vbus pin 210 can determine if the device 10 is configured as a slave or a host, as will be described in more detail in the following with reference to FIG. 5.

Figure 5:
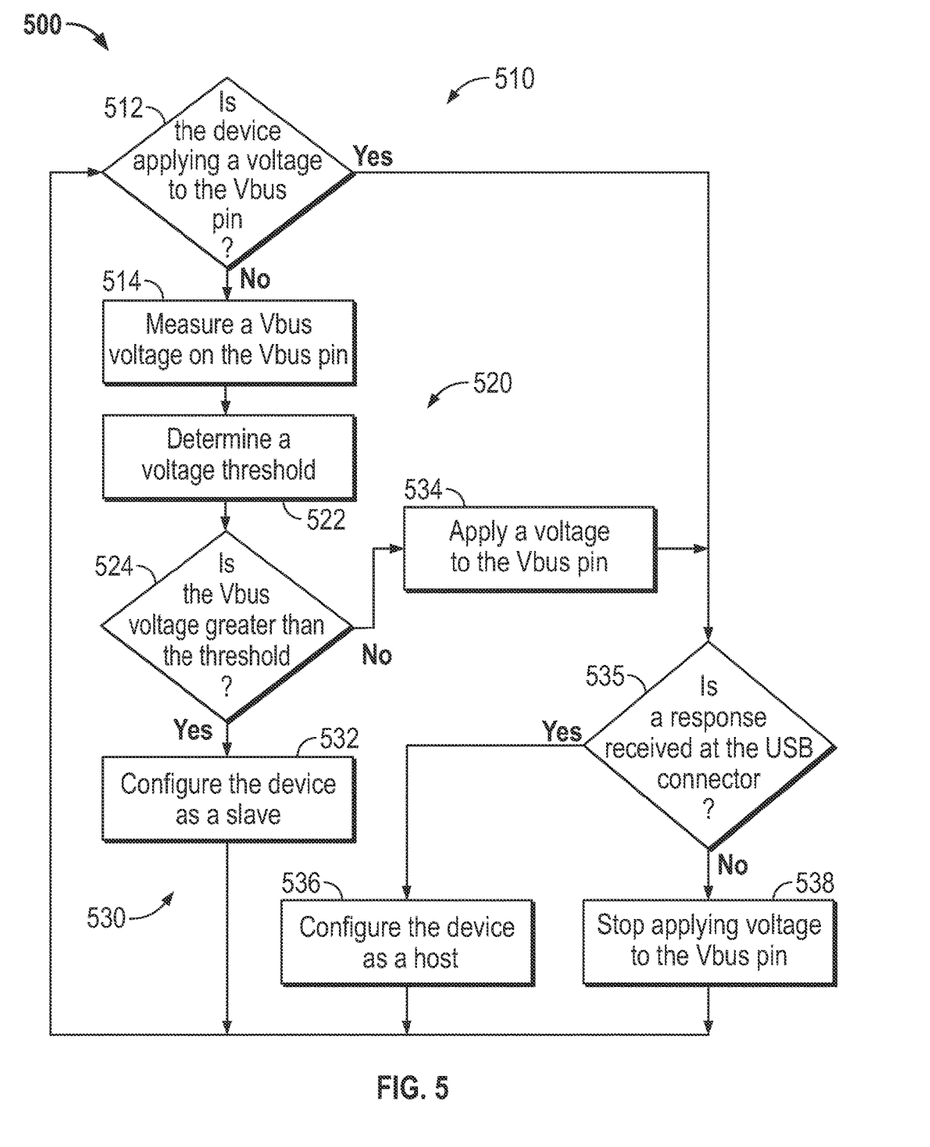
FIG. 5 shows a method 500 according to an embodiment.

FIG. 5 shows a method 500 according to an embodiment. The method 500, in step 510, determines a Vbus voltage on the Vbus pin 210 in the USB connector 200 on the device 10. In step 520, the Vbus voltage is compared with a threshold. The method 500 can configure the device 10 based on the comparison in step 530. Steps 510, 520, and 530 are comprised of additional steps, which will be described in more detail in the following.

To determine the Vbus voltage on the Vbus pin 210, step 510 determines if the device 10 is applying a voltage to the Vbus pin 210 in step 512 and measures the Vbus voltage on the Vbus pin 210 in step 514. In the embodiment shown in FIG. 1, the processor 110 can determine if the power supply module 120 is applying voltage to the Vbus pin 210. With reference to FIG. 2, the processor 110 can determine if a signal is being sent to the enable pin EN in the power switch 122 that causes the power switch 122 to apply voltage to the Vbus pin 210. For example, code executing in the processor 110 could check to see if the processor 110 is sending a "1" bit to the enable pin EN. If the device 10 is applying voltage to the Vbus pin 210, then the method 500 moves to step 526 to determine if a response is being received at the USB connector 200, which will be described in more detail in the following with reference to step 520.

Still referring to step 512, if the device 10 is not applying voltage to the Vbus pin 210, then the method 500 will measure the Vbus voltage on the Vbus pin 210 in step 514. The voltage comparison module 130 can measure the Vbus voltage on the Vbus pin 210. For example, in the embodiment shown in FIG. 2, the voltage comparator U1 can measure the Vbus voltage on the Vbus pin 210 using the trace shown in FIG. 2. The Vbus voltage measurement can be an analog voltage value although alternative embodiments can include, for example, digital sampling or other measurement techniques. However determined, the Vbus voltage is compared with the threshold, beginning with step 522.

In step 522, the threshold is determined. For example, the voltage comparison module 130 can determine the threshold voltage with parameters that, for example, are set by internal components. For example, in the embodiment of FIG. 2, the threshold can be the R2 voltage that is measured by the voltage comparator U1 at the reference pin. As discussed in the foregoing, the R2 voltage can be determined by the ratios of the first and second resistors R1, R2.

In step 524, the apparatus 100 can determine if the Vbus voltage is greater than the threshold. In the embodiment of FIG. 1, the voltage comparison module 130 can determine if the Vbus voltage is greater than the threshold. For example, in the embodiment of FIG. 2, the voltage comparator U1 can compare the Vbus voltage to the R2 voltage and send a signal to the processor 110 indicating that the Vbus voltage is greater than the R2 voltage. In alternative embodiments, the comparison between the Vbus voltage and the threshold may be inverted. For example, alternative voltage comparators may send the signal to the processor 110 if the Vbus voltage is less than the threshold. Alternatively, the Vbus voltage and the R2 voltage can be digitized and compared numerically to determine if the Vbus voltage is greater than the threshold. If the Vbus voltage is greater than the threshold, then the apparatus 100 may configure the device 10 as a slave. For example, the apparatus 100 can configure the device 10 as a slave by disabling the power supply module 120 so the voltage applied to the Vbus pin 210 is zero. In the embodiment of FIG. 2, the power supply module 120 can be disabled due to, for example, the processor 110 applying zero volts to the enable pin EN on the power switch 122. Accordingly, the power switch 122 may not apply a voltage to the Vbus pin 210.

If, in step 524, the apparatus 100 determines that the Vbus voltage is less than the threshold, then the device 10 can be configured as a host. For example, with reference to FIG. 1, the apparatus 100 may configure the device 10 as a host by applying a voltage to the Vbus pin 210 in the USB connector 200 in step 534. The apparatus 100 can apply a voltage to the Vbus pin 210 to determine if the low or zero Vbus voltage on the Vbus pin 210 is due to the peripheral 250 being configured as a slave or if the peripheral 250 is not attached to the USB connector 200. In particular, the apparatus 100 can determine if a response is received at the USB connector 200 in step 526 after the voltage is applied to the Vbus pin in step 535.

As discussed in the foregoing, if the peripheral 250 is attached to the USB connector 200 and is configured as a slave, the peripheral 250 will send a response to the USB connector 200 when the voltage is applied to the Vbus pin 210. Accordingly, if a response is not received at the USB connector 200, then the peripheral 250 may not be attached to the USB connector 200. Therefore, if a response is not received at the USB connector 200, the apparatus 100 stops applying the voltage to the Vbus pin 210 in step 538 and returns to step 510. The processor 110 can wait for a period of time for the response.

The period of time can be set by a software running on the processor 110. The period of time can also be set to ensure that voltages on the peripheral 250 are discharged. For example, the peripheral 250 may be charged due to capacitance in the peripheral 250 when the device 10 applies the voltage to the Vbus pin 210. The capacitance in the peripheral 250 can discharge through the third and fourth resistors R3, R4 during the period of time, as described in the foregoing with reference to FIG. 2. The period of time can also be set for other reasons, such as ensuring that sufficient time is provided for the peripheral 250 to respond.

If, in step 535, the apparatus 100 determines that a response is received at the USB connector 200, then the device 10 is configured as a host in step 536. In the embodiment shown in FIG. 1, the apparatus 100 can configure the device 10 as a host by sending a signal to the power supply module 120 so the power supply module 120 applies a voltage to the Vbus pin 210. For example, as shown in FIG. 2, the processor 110 can send a signal comprised of a voltage that is greater than zero to the enable pin EN on the power switch 122. The signal sent to the enable pin EN can cause the power switch 122 to apply the +5.0 VDC to the voltage out pin VOUT, although different voltages can be applied in alternative embodiments. Accordingly, the apparatus 100 can apply voltage to the Vbus pin 210 in the USB connector 200, which may have a peripheral 250 configured as a slave attached to the USB connector 200.

In configuring the device 10 as a host, the processor 110 can also initiate communication with the peripheral 250. For example, the processor 110 can choose a host communication protocol stack ("host stack") that is compatible with the USB standard to communicate with the peripheral 250 attached to the USB connector 200. The host stack implemented by the apparatus 100 may be stored in the processor 110 memory (not shown) or any other appropriate storage device. The host stack can be adapted to initiate and control communication between the device 10 and the peripheral 250 through the USB connector 200.

For example, the host stack may initiate data transfer mechanisms. In the embodiment shown in FIG. 1, the host stack may direct the processor 110 to implement a control data transfer mechanism in which, for example, the processor 110 sends commands to or queries parameters from the peripheral 250. The host stack can also cause the processor 110 to query for interrupt requests by the peripheral 250. Other data transfer mechanisms defined in the USB standard can also be employed.

When the device 10 is configured as a slave, the peripheral 250 will provide voltage to the Vbus pin 210 and initiate the data transfer mechanism. To communicate with the peripheral 250 configured as a host, the apparatus 100 can configure the device 10 as a slave by disabling the power supply module 120 and implementing a slave stack in the processor 110. For example, the processor 110 could send a signal of about zero volts to the enable pin EN on the power switch 122 shown in FIG. 2. The processor 110 can also load the slave stack into the processor 110. The slave stack can direct the processor 110, or other portions of the device 10, such as a USB communications chip, to receive communications from the peripheral 250 through the USB connector 200.

For example, a personal computer with a program configured to operate the device 10 may be attached to the USB connector 200. The personal computer is configured as a host and, therefore, may apply a voltage to the Vbus pin 210. The apparatus 100 can determine the Vbus voltage on the Vbus pin 210 and configure the device 10 as a slave by comparing the Vbus voltage with a threshold. The apparatus 100 can also cause the processor 110, or other components on the device 10, to implement the slave stack that sends a response to the personal computer. The response can be received by the program on the personal computer, which can send signals that cause the device 10 to perform functions, such as responding with data, setting parameters, or the like.

The embodiments described above provide an apparatus 100 and a method 300-500 to control a mode of a device 10. As explained above, the apparatus 100 and the method 300-500 can determine a Vbus voltage on a Vbus pin 210 in a USB connector 200 that does not include an ID pin. The Vbus voltage can be compared to a threshold to determine if the peripheral 250 attached to the USB connector 200 is a host or a slave. Based on the configuration of the peripheral 250, the apparatus 100 and method 300-500 can configure the device 10 as a slave or a host.

As a result, USB connectors 200 that are not OTG compliant and do not include ID pins can be employed in the device 10 that may be configured as a host or a slave. Accordingly, a single USB connector 200 can be employed in communications between the device 10 and the peripheral 250, where the peripheral 250 can be configured as a host or a slave. For example, the USB Type A connector defined in the USB 2.0 specification can be employed in the device 10 when the device 10 is configured as a slave or a host.

Using a single USB connector 200 on devices 10 that can be configured as a host or a slave can reduce the costs of implementing new designs. In the embodiments described in the foregoing, the apparatus 100 and method 300-500 for controlling the mode of the device 10 can configure the device 10 with a host or a slave stack that is more simple than the OTG standard. For example, the host and slave stack implemented on the device 10 does not necessarily include the RSP and HNP protocols required by the OTG standard. This reduces the software overhead on, for example, the processor 110 which allows the processor 110 to perform other functions without a delay that can be caused by the RSP or HNP protocols. In addition, legacy hardware, such as memory sticks with the USB Type A connector, can be employed. This can ensure that customers of the device 10 manufacturers are not required to upgrade their peripherals.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other apparatus and methods for controlling the mode of a device, and not just to the embodiments described above and shown in the accompanying figures. Accordingly, the scope of the embodiments described above should be determined from the following claims.

We claim:

1. A method of controlling a mode of a device, the method comprising:
   measuring a Vbus voltage on a Vbus pin in a USB connector on the device;
   comparing the Vbus voltage with a threshold;
   determining if the device is applying a voltage to the Vbus pin; and
   configuring the device as a host or a slave based on the comparison of the Vbus voltage and the threshold and the determination of whether the device is applying the voltage to the Vbus pin, wherein the determination is based on whether a signal enables the voltage.

2. The method of claim 1, wherein the step of configuring the device comprises:
   if the device is not applying the voltage to the Vbus pin, then configuring the device based on the comparison of the Vbus voltage and the threshold; and
   if the device is applying the voltage to the Vbus pin, then continue determining if the device is applying a voltage to the Vbus pin until the device is not applying the voltage to the Vbus pin.

3. The method of claim 1, wherein the step of configuring the device comprises:
   determining if a response is received at the USB connector;
   if the response is not being received at the USB connector, then stop applying the voltage to the Vbus pin; and
   if the response is being received at the USB connector, then configuring the device as a host.

4. The method of claim 1, wherein the step of comparing the Vbus voltage on the Vbus pin with the threshold comprises determining:
   if the Vbus voltage is greater than the threshold, then indicating that a peripheral configured as a host is attached to the USB connector; and
   if the Vbus voltage is less than the threshold, then indicating that a peripheral configured as a slave is attached to the USB connector.

5. The method of claim 1, wherein the step of configuring the device comprises:
   if the comparison indicates that a peripheral configured as a slave is attached to the USB connector, then configuring the device as a host; and
   if the comparison indicates that a peripheral configured as a host is attached to the USB connector, then configuring the device as a slave.

6. The method of claim 1, wherein the step of configuring the device comprises:
   applying the voltage to the Vbus pin;
   monitoring the USB connector to determine if a response is received;
   if the response is not received, then stop applying the voltage to the Vbus pin; and
   if the response is received, then configuring the device as the host.

7. The method of claim 1, wherein configuring the device is comprised of selectively applying a voltage to the Vbus pin and configuring the device with one of a slave stack and a host stack.

8. An apparatus (100) to control a mode of a device (10), the apparatus (100) comprised of:
   a processor (110); and a voltage comparison circuit (130) coupled to the processor (110);

wherein the processor (110) and the voltage comparison circuit (130) are adapted to measure a Vbus voltage on a Vbus pin (210) in a USB connector (200) on the device (10) and determine if the device (10) is applying a voltage to the Vbus pin (210);

the voltage comparison circuit (130) is adapted to compare the Vbus voltage with a threshold; and the processor (110) is adapted to configure the device (10) as a host or a slave based on the comparison of the Vbus voltage and the threshold and the determination of whether the device (10) is applying the voltage to the Vbus pin (210), wherein the determination is based on whether a signal enables the voltage.

9. The apparatus (100) of claim 8, wherein:
the processor (110) adapted to configure the device (10) comprises the processor (110) adapted to:
    if the device (10) is not applying the voltage to the Vbus pin (210), then configure the device (10) as a host based on the comparison of the Vbus voltage and the threshold; and
    if the device (10) is applying the voltage to the Vbus pin (210), then continue to determine if the device (10) is applying the voltage to the Vbus pin (210) until the device (10) is not applying the voltage to the Vbus pin (210).

10. The apparatus (100) of claim 8, wherein the processor (110) adapted to configure the device (10) comprises the processor (110) adapted to:
    determine if a response is received at the USB connector (200);
    if the response is not received at the USB connector (200), then stop applying the voltage to the Vbus pin (210); and
    if the response is received at the USB connector (200), then configure the device (10) as a host.

11. The apparatus (100) of claim 8, wherein the voltage comparison circuit (130) adapted to compare the Vbus voltage on the Vbus pin (210) with the threshold comprises the voltage comparison circuit (130) adapted to:
    measure the Vbus voltage on the Vbus pin (210);
    if the Vbus voltage is greater than the threshold, then indicate that a peripheral (250) configured as a host is attached to the USB connector (200); and
    if the Vbus voltage is less than the threshold, then indicate that a peripheral (250) configured as a slave is attached to the USB connector (200).

12. The apparatus (100) of claim 8, wherein the processor (110) adapted to configure the device (10) comprises the processor (110) adapted to:
    if the comparison indicates that a peripheral (250) configured as a slave is attached to the USB connector (200), then configure the device (10) as a host; and
    if the comparison indicates that a peripheral (250) configured as a host is attached to the USB connector (200), then configure the device (10) as a slave.

13. The apparatus (100) of claim 8, further comprising:
a power supply circuit (120) coupled to the processor (110) and the Vbus pin (210), the power supply circuit (120) adapted to selectively apply the voltage to the Vbus pin (210);
wherein the processor (110) adapted to configure the device (10) comprises the processor (110) adapted to:
    send the signal to the power supply circuit (120) to cause the power supply circuit (120) to apply the voltage to the Vbus pin (210);
    monitor the USB connector (200) to determine if a response is received;
    if the response is not received, then stop applying the voltage to the Vbus pin (210); and
    if the response is received, then configure the device (10) as a host.

14. The apparatus (100) of claim 13, wherein the processor (110) adapted to apply a voltage to the Vbus pin (210) comprises the processor (110) adapted to send a signal to the power supply circuit (120) to apply a voltage to the Vbus pin (210).

15. The apparatus (100) of claim 8, wherein the processor (110) adapted to configure the device (10) comprises the processor (110) adapted to:
    selectively apply a voltage to the Vbus pin (210); and
    configure the device with one of a slave stack and a host stack.

* * * * *